(12) United States Patent
Ikuta

(10) Patent No.: US 11,159,066 B2
(45) Date of Patent: Oct. 26, 2021

(54) ROTARY ELECTRIC MACHINE AND ROTOR MOUNTED THEREIN

(71) Applicant: DENSO CORPORATION, Kariya (JP)

(72) Inventor: Hiroyuki Ikuta, Kariya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 16/447,435

(22) Filed: Jun. 20, 2019

(65) Prior Publication Data

US 2019/0312473 A1 Oct. 10, 2019

Related U.S. Application Data

(63) Continuation of application No. PCT/JP2017/042110, filed on Nov. 22, 2017.

(30) Foreign Application Priority Data

Dec. 20, 2016 (JP) .............................. JP2016-246540

(51) Int. Cl.
*H02K 1/26* (2006.01)
*H02K 1/27* (2006.01)
(Continued)

(52) U.S. Cl.
CPC ............... *H02K 1/265* (2013.01); *H02K 1/22* (2013.01); *H02K 1/26* (2013.01); *H02K 1/2773* (2013.01);
(Continued)

(58) Field of Classification Search
CPC ............ H02K 1/22; H02K 1/26; H02K 1/265; H02K 1/2773; H02K 1/30; H02K 11/216; H02K 15/02; H02K 17/16
(Continued)

(56) References Cited

U.S. PATENT DOCUMENTS 5,758,709 A * 6/1998 Boyd, Jr. ........... B22D 19/0054
164/109
6,727,627 B1 * 4/2004 Sasaki .................... H02K 1/276
310/156.53
(Continued)

FOREIGN PATENT DOCUMENTS

EP 2506396 A2 10/2012
JP S57-155980 U 9/1982
(Continued)

OTHER PUBLICATIONS

Feb. 27, 2018 International Search Report issued in International Application No. PCT/JP2017/042110.

*Primary Examiner* — Tulsidas C Patel
*Assistant Examiner* — Rashad H Johnson
(74) *Attorney, Agent, or Firm* — Oliff PLC

(57) ABSTRACT

A rotor of rotary electric machines includes a rotor core which include first and second core blocks. The first core block is formed by stacking the steel plates in a state where the steel plates are engaged by a first crimping portion and skewed in a first direction in a circumferential direction. The second core block is formed by stacking the steel plates in a state where the steel plates are engaged by a second crimping portion and skewed in a second direction facing the first direction. The first and second core blocks are connected in an axial direction in the rotor core. A hole for inserting the first crimping portion is provided in an intermediate steel plate which is part of the annular steel plates. This intermediate steel plate is provided at a block boundary position of the second core bock and is connected to the first core block.

21 Claims, 13 Drawing Sheets

(a)

(b)

(51) Int. Cl.
*H02K 1/30* (2006.01)
*H02K 17/16* (2006.01)
*H02K 11/215* (2016.01)
*H02K 15/02* (2006.01)
*H02K 1/22* (2006.01)

(52) U.S. Cl.
CPC ............. *H02K 1/30* (2013.01); *H02K 11/215* (2016.01); *H02K 15/02* (2013.01); *H02K 17/16* (2013.01)

(58) Field of Classification Search
USPC ...... 310/156.47, 216.001, 216.025, 216.088, 310/216.089
See application file for complete search history.

(56) References Cited

U.S. PATENT DOCUMENTS

| | | | |
|---|---|---|---|
| 2008/0174203 A1* | 7/2008 | Makino | H02K 1/30 310/270 |
| 2010/0102666 A1* | 4/2010 | Kaiser | H02K 17/165 310/211 |
| 2012/0210563 A1* | 8/2012 | Wang | H02K 15/0012 29/598 |
| 2013/0249328 A1* | 9/2013 | Dokonal | H02K 1/187 310/43 |
| 2014/0246943 A1* | 9/2014 | Omekanda | B60L 1/00 310/211 |
| 2016/0329784 A1 | 11/2016 | Tamura et al. | |
| 2019/0006895 A1* | 1/2019 | Sim | H02K 5/04 |

FOREIGN PATENT DOCUMENTS

| | | |
|---|---|---|
| JP | S59-37879 U | 3/1984 |
| JP | H10-225034 A | 8/1998 |
| JP | H11-41872 A | 2/1999 |
| JP | 2002-136015 A | 5/2002 |
| JP | 2004-64799 A | 2/2004 |
| JP | 2009-278783 A | 11/2009 |
| JP | 2011-244594 A | 12/2011 |
| JP | 5873420 B2 | 3/2016 |

* cited by examiner (a)

(b)

(a)

(b)

(a)

(b)

(a)

(b)

ROTARY ELECTRIC MACHINE AND ROTOR MOUNTED THEREIN

BACKGROUND

Technical Field

The present disclosure relates to a rotor of a rotary electric machine and to a rotary electric machine, in which the rotor is mounted on apparatuses such as a vehicle and used as an electric motor or an electric generator.

Related Art

As a rotor of a rotary electric machine, there is known a rotor core formed by stacking a plurality of annular steel plates on one another and slightly skewing each steel plate in the circumferential direction for each successive layer of the steel plates. Moreover, known is a technique in which a rotor core is formed using a plurality of core blocks in which skew directions in the circumferential direction are different from each other, and thus, the rotor core is skewed into a V-shape or a W-shape.

SUMMARY

In the present disclosure, there is provided a rotor of rotary electric machines. The rotor includes a rotor core which include first and second core blocks. The first core block is formed by stacking the steel plates in a state where the steel plates are engaged by a first crimping portion and skewed in a first direction in a circumferential direction. The second core block is formed by stacking the steel plates in a state where the steel plates are engaged by a second crimping portion and skewed in a second direction facing the first direction. The first and second core blocks are connected in an axial direction in the rotor core. A hole for inserting the first crimping portion is provided in an intermediate steel plate which is part of the annular steel plates. This intermediate steel plate is provided at a block boundary position of the second core bock and is connected to the first core block.

BRIEF DESCRIPTION OF THE DRAWINGS

With reference to the drawings, these and other objects, characteristics and advantages of the present disclosure will become more apparent from the following detailed description. In the accompanying drawings.

DESCRIPTION OF THE EMBODIMENTS

Figure 1:
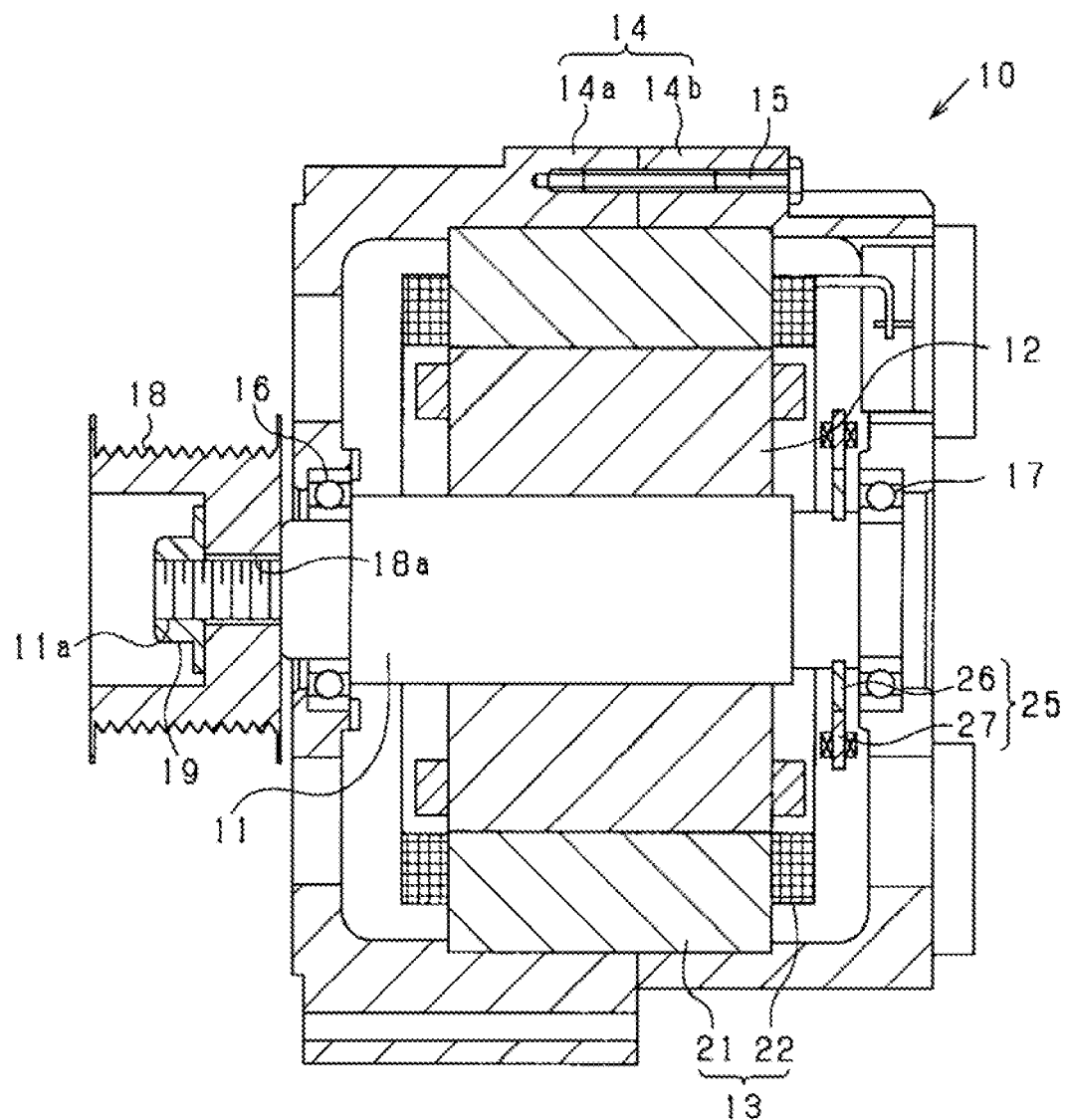
FIG. 1 is an axial cross-sectional view of a rotary electric machine according to an embodiment.

In the technical field concerning the present disclosure, there is known a method of manufacturing a rotor core, a first core block and a second core block having a cylindrical shape and a plurality of slots at the outer edge. A second core block is superposed on the first core block with the top and bottom reversed, and the second core block is aligned with the first core block so that the slots of the steel sheets at the superposed ends coincide with each other. Conductor bars are formed in the slots of the core blocks by casting molten conductors to connect the the respective core blocks. By having positioning pins to pass through a plurality of straight holes in the axial direction formed in the respective core blocks, the core blocks are set to align with each other.

However, in the rotor core which is skewed in the V-shape or W-shape as described above, it is conceivable that the workability in assembling a plurality of core blocks is hindered. The reason for the hindrance is due to the interference of the crimping portion which fixes the steel plates to each other. That is, since the crimping portion provided on each steel plate is formed to protrude from either of the plate surfaces, the crimping portions protrude in the axial direction at the end portions of the core block. Therefore, it is considered necessary to improve the technology of the rotor while considering the protrusion of the crimping portion.

Hence, it is desired to provide a rotor of a rotary electric machine and a rotary electric machine that can improve the workability when manufacturing the rotor.

VARIOUS EMBODIMENTS

Hereinafter, various embodiments will be described with their structures and effects.

First Embodiment

In a first embodiment, a rotor of a rotary electric machine having a rotor core formed by stacking a plurality of annular steel plates. The rotor incudes a first core block formed by stacking the steel plates in a state in which the steel plates are engaged by a first crimping portion (crimped portion or crimp) and skewed in a first direction in a circumferential direction; and a second core block formed by stacking the steel plates in a state in which the steel plates are engaged by a second crimping portion (crimped portion or crimp) and skewed in a second direction opposed to the first direction. In this configuration, the first core block and the second core block are connected in an axial direction in the rotor core; and a hole for inserting the first crimping portion is provided in an intermediate steel plate which is the steel plate at a block boundary position connected to the first core block from the second core block.

When using a plurality of core blocks formed by stacking a plurality of steel plates in a crimped state and connecting the core blocks together in the axial direction, interference of the crimped portions occurs at the joint boundary portions between the core blocks. This may cause inconvenience in manufacturing the rotor core. That is, since the skew directions of the core blocks are different from each other, the crimping portions cannot be engaged in the stacking direction, and mutual interference occurs. In this regard, in the above-described configuration, since the hole portion into which the first crimping portion is inserted is provided in the intermediate steel plate which is the steel plate at the block boundary position connected to the first core block in the second core block, interference with the crimping portion can be avoided by the hole portion. In addition, since the first crimping portion of the first core block is inserted into the hole portion of the second core block, mutual positioning in both core blocks becomes easy. As a result, the workability in manufacturing the rotor can be improved.

For example, the first core block and the second core block include n (n≥2) first crimping portions and the n second crimping portions provided at equal intervals in the circumferential direction, among both sides of the steel plates in the first core block, the steel plate on a side opposed to the intermediate steel plate has a circumferential position of the first crimping portion on the same position as the circumferential position of the second crimping portion, among the end steel plates of the first core block, the end steel plate on the opposite side to the intermediate steel plate has the first crimping portion inserted through the hole portion by rotating the first crimping portion of the intermediate steel plate at an angle of 360 degrees/n/2 such that the second core block is connected to the first core block.

In the above-described configuration, the first crimping portion is provided on one end side of the first core block in the axial direction (opposite side of the second core block) extending to the other end side in the axial direction (second core block side) such that the first crimping portion is skewed in the rotation angle defined by (360 degrees/n/2) in the circumferential direction. Among both sides of the steel plates in the first core block, the steel plate on a side opposed to the intermediate steel plate has a circumferential position of the first crimping portion at the same position as the circumferential position of the second crimping portion. In this case, the crimping portions can be uniformly arranged in the entire circumferential direction over the first core block and the second core block. In this way, the product thickness deviation in the circumferential direction can be reduced.

For example, a rotor of a rotary electric machine including the rotor core is configured to connect three or more core blocks in the axial direction, and the first core block is connected to both axial sides of the second core block, and among the first core blocks arranged on both axial sides of a second core block, the first core block arranged on the opposite side of the intermediate steel plate of the second core block includes a hole portion for inserting the second crimping portion provided in the intermediate steel plate, which is the steel plate at the block boundary position connected to the second core block.

According to the above-described configuration, even in the rotor core in which three or more core blocks are connected in the axial direction, the workability improves in manufacturing rotors as described above.

By way of example, the hole portion is provided as a crimping hole that allows a crimping portion to be press-fitted. In detail, the crimping portion serves as a portion to be crimpled and being one of the first crimping portion and the second crimping portion.

Since the hole portion provided in the intermediate steel plate of the second core block is a crimped hole that allows the first crimping portion of the first core block to be press-fitted, the two core blocks can be connected by the crimping. As a result, it is possible to improve the workability in handling the first core block and the second core block integrally.

Still, as an example, the rotor core has a shaft hole into which a rotary shaft is inserted is formed in the center in the radial direction. Furthermore, the shaft hole has at least one end of the shaft hole in the axial direction formed with a key structure part keyed to the rotary shaft.

In the above-described configuration, the rotary shaft is fixed to the shaft hole of the rotor core through key connection. Due to this, the phase determination of the rotor core with respect to the rotary shaft can be performed.

Still, as an example, the first core block includes a first rotor slot formed in the steel plates, the first rotor slot being formed to pass through the steel plates in a stacked direction of the steel plates and to be skewed at an angle which is the same as the angle of the first crimping portion, the second core block includes a second rotor slot formed in the steel plates, the second rotor slot being formed to pass through the steel plates in a stacked direction of the steel plates and to be skewed at an angle which is the same as the angle of the first crimping portion and to be skewed in an opposing side to the first rotor slot, the first rotor slot and the second rotor slot are connected to each other and conductor bars are provided in the respective rotor slots.

In the above-described configuration, the first rotor slot and the second rotor slot are provided at opposing skew angles to each other in the rotor core, and with the respective rotor slots in a connected manner, the conductor bars are provided in the rotor slots. In this case, since the skew angles of the respective rotor slots are opposed to each other, forces can be generated in opposite directions to each other in the core blocks when the conductor bars in the rotor slots are energized, and axial vibration can be suppressed.

Still, as an example, the rotor and the stator are used in a rotary electric machine in which the rotor and the stator are arranged opposing each other with the rotor being arranged radially inward and the stator being arranged radially outward. The first core block and the second core block are provided with the respective crimping portions being arranged more radially inward than the respective rotor slots.

In the above-described configuration, the respective core blocks are provided with the crimping portions arranged radially inward than the respective rotor slots. Further, crimping portions can be suitably provided by using portions positioned radially opposed to the stator.

Still, as an example, the first core block includes k first rotor slots (k≥2) arranged at equal intervals in the circumferential direction, and the second core block is provided with k second rotor slots at equal intervals in the circumferential direction. The respective rotor slots are skewed in a range defined as (360 degrees/k) in the circumferential direction between both axial ends of the respective core blocks.

In the above-described configuration, the respective core blocks of the rotor are provided with the k rotor slots arranged at equal intervals in the circumferential direction. The respective rotor slots are provided between both axial ends of the core block such that such rotor slots are skewed in a range defined by (360 degrees/k) in the circumferential direction. In this case, the reduction of the excitation force in the radial direction caused by the rotor slot can be achieved. In addition, magnetic noise can be reduced.

Still, as an example, the rotor is used in the rotary electric machine which includes a stator having an m-piece (m≥2)

stator slots provided at equal angles in the circumferential direction, and the rotor is provided to oppose the stator in the radial direction, and the respective rotor slots in the first core block and the second core block are provided between both axial ends of the respective core blocks such that the respective rotor slots are skewed in a range defined by (360 degrees/m) in the circumferential direction.

In the above-described configuration, the m-piece stator slots are provided in the stator at equal intervals in the circumferential direction, and the rotor slots of each core block are provided by skewing in the circumferential direction in a range of 360 degrees/m between both ends of the core block in the axial direction. In this case, the reduction of the excitation force in the radial direction caused by the stator slot can be achieved. In addition, magnetic noise can be reduced.

Still, as an example, a rotor is used in a cage-type induction machine in which end rings are provided at both axial ends of the rotor core by casting, crimping portions arranged at both ends of the rotor core of the first crimping portion and the second crimping portion are covered by the end rings, and the crimping portions of the respective laminated steel plates are filled with a casting material from the crimping portions at the both end positions.

In the above-described configuration, in the cage-type induction machine, end rings are provided at both axial ends of the rotor core by casting such that the end rings cover the both axial ends of the crimping portions of the rotor core. In this case, since the gap of the crimping portion is filled with the casting material for forming the end ring, even if vibration or the like occurs during use of the rotary electric machine, for example, the crimping off of the laminated steel plate caused by the vibration or the like can be suppressed.

Still, as an example, the end ring has a lower height of a portion covering the crimping portions with respect to the height of the rotor core from the end surface in the portion covering the end portion of the conductor bar.

In the above-described configuration, the casting material is assigned to each part according to the required amount of each part of the rotor. Therefore, weight reduction and cost reduction of the rotor can be achieved.

Still, as an example, in the rotary electric machine, a rotor and a stator are disposed oppositely to the rotor.

According to the rotary electric machine using the above-described excellent rotor, it is possible to achieve a configuration having high reliability against noise and vibration while being inexpensive.

Still, as an example, a rotary electric machine comprising a rotary shaft fixed to a radial center of the rotor, and a rotation detector for detecting a rotation of the rotary shaft, wherein the rotation detector comprises a detector rotor rotating together with the rotary shaft and a detector stator arranged radially outside the detector rotor and arranged to face the detector rotor, and the rotary electric machine has the detector rotor attached to the rotary shaft or the rotor.

In the case of a rotation detector in which the detector rotor and the detector stator are arranged to face each other radially inward and outward, there is a concern that the rotation detection is affected by a positional deviation in the axial direction caused by vibration or the like. In this respect, since the axial vibration can be minimized by combining the core blocks having different skew directions in the rotor core as described above, it is possible to minimize the influence on the rotation detection and thus to minimize the deterioration of the detection accuracy.

Still, as an example, a rotary electric machine includes a rotary shaft fixed to a radial center of the rotor, and has a pulley fixed to a distal end portion of the rotary shaft, and the rotary shaft has the distal end portion attached with a fastening member for fixing the pulley by an axial clamping force in the axial direction.

In the above-mentioned rotary electric machine, since the axial vibration can be suppressed by combining the core blocks having different skew directions to each other in the rotor core, the variation of the clamping force (axial force) of the fastening member due to the axial vibration can be suppressed. With this, it can be possible to minimize loosening of the nut or the like.

Still, as an example, a rotary electric machine includes a rotary shaft fixed to a radial center of the rotor, and in which a rotating member rotating coaxially is connected to a distal end portion of the rotary shaft, and the rotary shaft has a distal end portion on which a spline is connected in a power-transmittable state with respect to the rotating member.

In the above-mentioned rotary electric machine, since the axial vibration can be minimized by combining the core blocks having different skew directions to each other in the rotor core, it is possible to minimize the wear of splines and the generation of foreign matter due to the axial vibration.

Second Embodiment

A second embodiment and other embodiments will now be described below with reference to the drawings. In the following embodiments, portions that are the same or equivalent to each other are denoted by the same reference numerals in the drawings, and the description of the portions denoted by the same reference numerals is referred to.

The rotary electric machine 10 according to the second embodiment is a cage type induction motor used as a vehicle alternator. As shown in FIG. 1, the rotary electric machine 10 includes a rotor 12 fixed to a rotary shaft 11, a stator 13 provided at a position surrounding the rotor 12, and a housing 14 accommodating the rotor 12 and the stator 13. The stator 13 has a stator core 21 having an annular shape and disposed on the outer circumferential side of the rotor 12 such that the stator core 21 and the rotor 12 face each other in the radial direction, and a stator winding 22 wound around the stator core 21. The housing 14 has a pair of bottom cylindrical housing members 14a and 14b, which are integrated by fastening the bolts 15 with the housing members 14a and 14b connected together at openings.

The housing 14 is provided with bearings 16 and 17, and the rotary shaft 11 and the rotor 12 are rotatably supported by the bearings 16 and 17. A pulley 18 is attached to one end side of the rotary shaft 11. More specifically, a male screw portion 11a is formed on one end side of the rotary shaft 11, and the male screw portion 11a is inserted into a hole portion 18a formed in a center portion of the pulley 18. The pulley 18 is fixed to the rotary shaft 11 by fastening the nut 19 to the male screw portion 11a.

The pulley 18 may be fixed to the rotation shaft 11 by providing an axially extending female screw portion at the distal end portion of the rotation shaft 11 and fastening a bolt to the female screw. That is, any configuration may be employed as long as a fastening member for fixing the pulley 18 by an axial clamping force is attached to the distal end portion of the rotary shaft 11.

The rotary shaft 11 is provided with a resolver 25 which serves as a rotation detector for detecting rotation of the rotor 12. The resolver 25 has a resolver rotor 26 (detector rotor) fixed to the rotary shaft 11, and a resolver stator 27 (detector stator) having an annular shape and disposed radially opposed to each other on the outer peripheral side of the resolver rotor 26. More specifically, the resolver stator 27 includes a resolver core and a resolver coil wound around the resolver core. When the rotation shaft 11 rotates, the resolver rotor 26 rotates together with the rotary shaft 11. In association with the rotation, the rotation speed of the rotation shaft 11 (the rotor 12) is detected by a change in the magnetic flux. A resolver rotor 26 may be fixed to the rotor 12.

Figure 2:
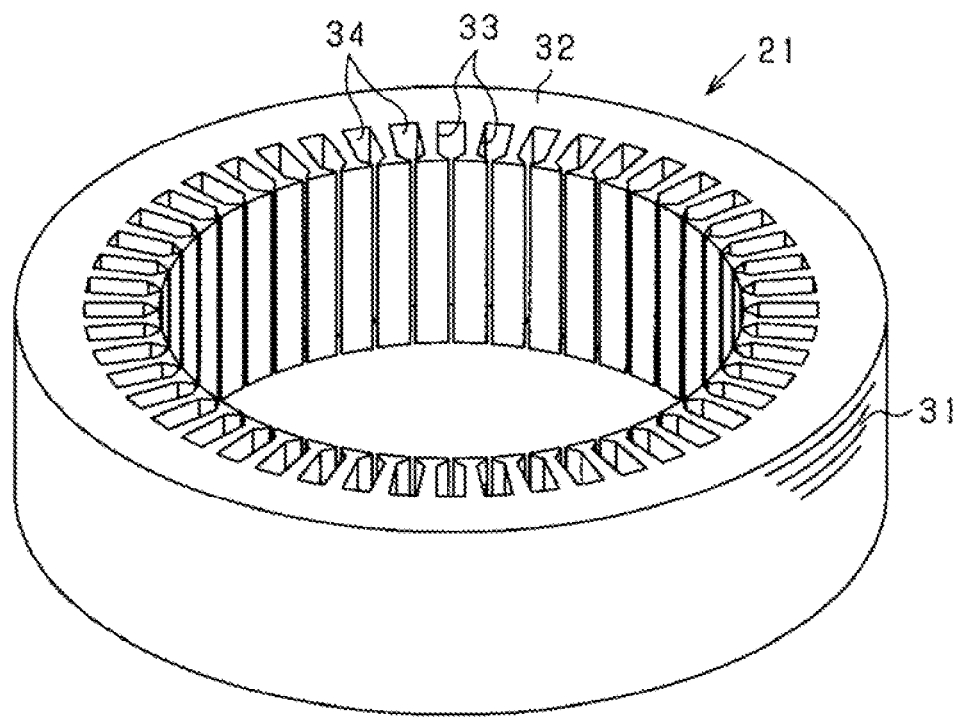
FIG. 2 is a perspective view of the stator core.

The stator core 21 constituting the stator 13 has the configuration shown in FIG. 2. That is, the stator core 21 is an integral type formed by stacking a plurality of annular steel plates 31 in the axial direction of the stator core 21. The steel plate 31 is formed by press punching a strip-shaped electrical steel plate material. The stator core 21 has an annular back core portion 32 and a plurality of teeth 33 protruding radially inward from the back core portion 32 and arranged at a predetermined distance in the circumferential direction, and slots 34 (stator slots) are formed between adjacent teeth 33. In the stator core 21, the slots 34 are provided at equal intervals in the circumferential direction, and around the slots 34, the stator windings 22 are wound. (see FIG. 1). In the second embodiment, the number of slots 34 is 72. However, the number is arbitrary. These slots 34 are U-phase slots, V-phase slots and W-phase slots, respectively, in the circumferential direction.

Figure 3:
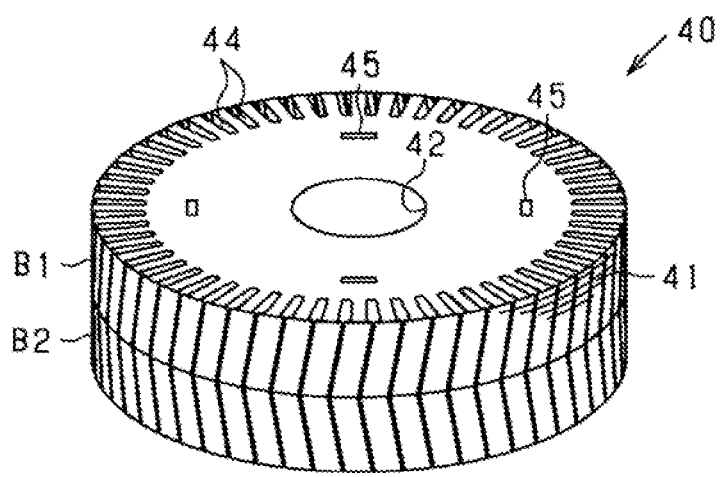
FIG. 3 is a perspective view of the rotor core.

Next, the rotor core 40 constituting the rotor 12 will be described. As shown in FIG. 3, the rotor core 40 is an integral type formed by stacking a plurality of annular steel plates 41 in the axial direction of the rotor core 40. The steel plate 41 is formed by press punching a strip-shaped electrical steel plate material. In the rotor core 40, a shaft hole 42 for inserting the rotary shaft 11 is formed at the center in the radial direction. In the rotor core 40, a plurality of slots 44 (i.e., rotor slots) are formed at equal intervals in the circumferential direction, and a plurality of lamination holding portions 45 are formed at equal intervals in the circumferential direction. In the rotor core 40, the slot 44 is provided at the outer edge of the core, and the lamination holding portion 45 is provided at the inner side thereof.

The slot 44 is provided so as to pass through the rotor core 40 in the axial direction, and the slot 44 is filled with conductor bars 46 (see FIG. 4(a)). In the second embodiment, the number of slots 44 is 60. However, the number is arbitrary.

The lamination holding portion 45 is a portion for holding a plurality of steel plates 41 in a laminated state, and specifically, the respective steel plates 41 are held in a laminated state by engagement (press-fitting) of a crimping portion (crimpled portion or crimps) provided in the respective steel plates 41. In the present embodiment, the number of the lamination holding portions 45 is 4. However, the number is arbitrary. Details will be described later.

The rotor core 40 of the second embodiment is configured by stacking a plurality of steel plates 41 in a skewed manner in the circumferential direction at a predetermined angle, and in particular, is configured by connecting two core blocks having skewed directions in the circumferential direction opposed to each other. That is, as shown in FIG. 3, the rotor core 40 includes a first core block B1 and a second core block B2, which are configured to be connected in the axial direction. Therefore, as shown in FIG. 4(a), the slot 44 is bent at a predetermined skew angle when viewed in the axial direction of the rotor core 40, and the conductor bar 46 is formed in the bent shape. For the sake of convenience, only one of the conductor bars 46 is shown in FIG. 4(a).

Figure 5:
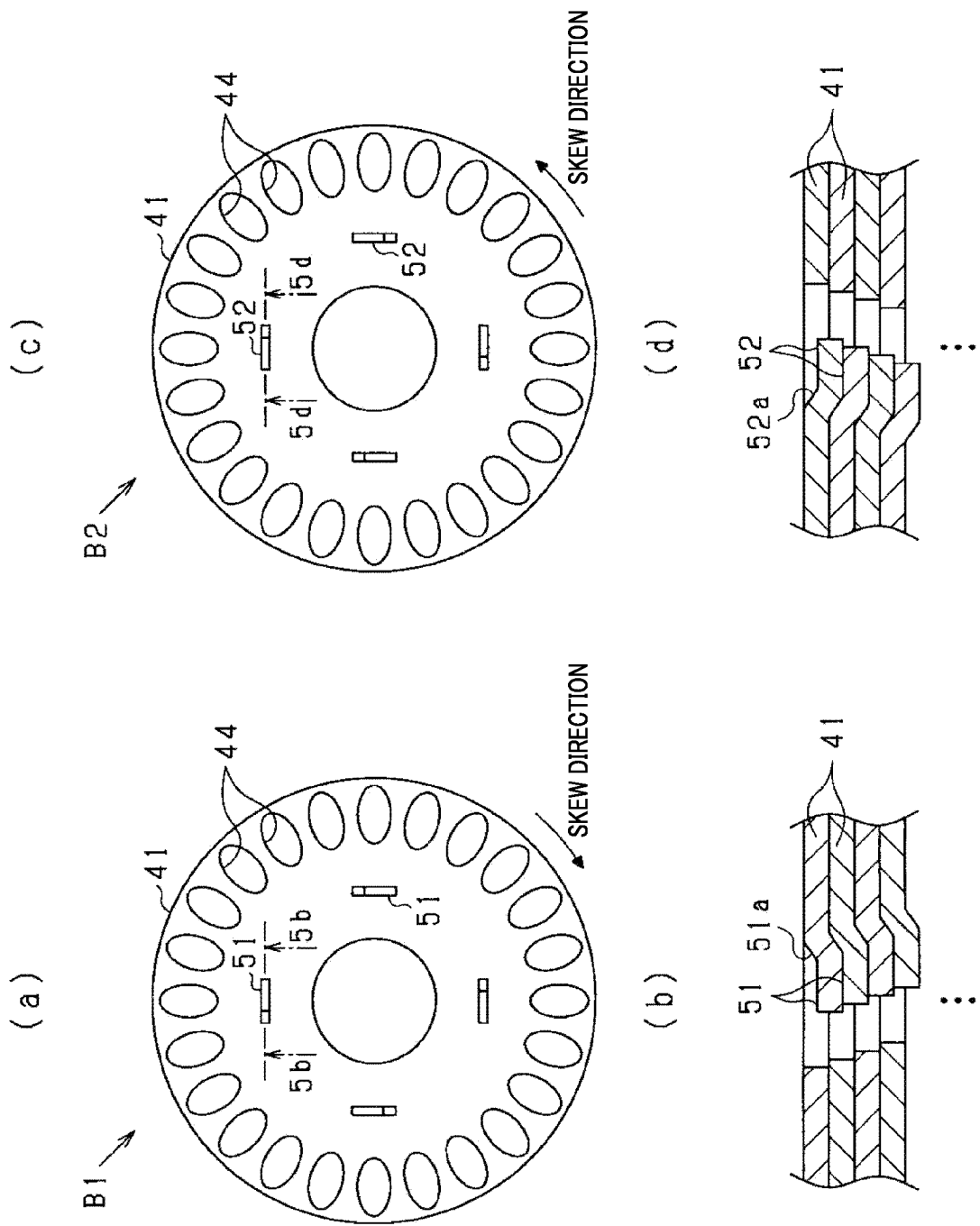
FIG. 5 is a diagram for describing the configuration of each core block of the rotor core.

With reference to FIG. 5, the configuration and the difference between the core blocks B1 and B2 will be described. FIGS. 5(a) and 5(b) are diagrams showing the configuration of the first core block B1. FIG. 5(a) is a plan view of the first core block B1, and FIG. 5(b) is a cross-sectional view taken across a line 5b-5b of FIG. 5(a). FIGS. 5(c) and 5(d) are diagrams showing the configuration of the second core block B2, where FIG. 5(c) is a plan view of the second core block B2, and FIG. 5(d) is a 5d-5d cross-sectional view of FIG. 5(a). For the sake of convenience, the number of slots 44 shown in FIG. 5 is shown less than the actual number of slots 44.

In the first core block B1, there are four crimping portions 51 formed on the steel plate 41 in the circumferential direction (number of crimping n=4). The respective crimping portions 51 are linearly provided on a circle centered on the core axis so as to extend in a tangential direction of the circle. The crimping portion 51 is formed in a cantilever shape by punching, and protrudes to only on one of the four sides of the rectangle, that is, in a state in which one end of both ends in the circumferential direction is connected. In this case, the crimping base end portion 51a is inclined obliquely with respect to the steel plate surface, and by stacking the steel plates 41, a skew of a predetermined angle is given to the respective steel plates 41 by the crimping base end portion 51a. In short, the first core block B1 is formed by a plurality of skewed steel plates 41 being engaged by a crimping portion 51 and stacked clockwise (in a first direction) in a circumferential direction of the drawing.

In the second core block B2, there are four crimping portions 52 formed on the steel plate 41 in the circumferential direction (number of crimping portions n=4). The respective crimping portions 52 are linearly provided on a circle centered on the core axis so as to extend in the tangential direction of the circle. The crimping portion 52 has a cantilever shape formed by punching, and protrudes to only on one of the four sides of the rectangle, that is, in a state in which one end of both ends in the circumferential direction is connected. In this case, the crimping base end portion 52a is inclined obliquely with respect to the steel plate surface, and by stacking the steel plate 41, a skew of a predetermined angle is given to the respective steel plates 41 by the crimping base end portion 52a. In short, the second core block B2 is formed by a plurality of skewed steel plates 41 being engaged by a crimping portion 52 and stacked counterclockwise (in a second direction opposed to the first direction) in a circumferential direction of the drawing.

The crimping portion 51 of the first core block B1 and the crimping portion 52 of the second core block B2 are formed in opposite directions to each other and formed in the same size, and are provided on circles having the same radius, respectively. The crimping portion 51 corresponds to a "first crimping portion" and the crimping portion 52 corresponds to a "second crimping portion".

When connecting the core blocks B1 and B2, there is a concern that the crimping portion of the steel plate 41 at the axial end portion n (crimping portion at the end portion of the crimping protruded side) of the first core block B1 may interfere with the steel plate 41 at the axial end portion of the second core block B2. In the second embodiment, a hole portion for inserting a crimping portion 51 of the first core block B1 is provided in the intermediate steel plate 41A, which is a steel plate, arranged in the second block at a block boundary position connected to the first core block B1, thereby preventing interference between the core blocks B1 and B2.

Figure 6:
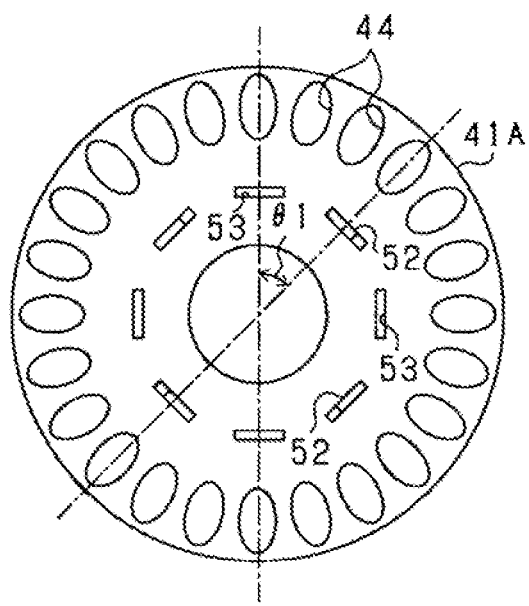
FIG. 6 is a diagram for describing a configuration of a boundary portion of each core block.
Figure 6:
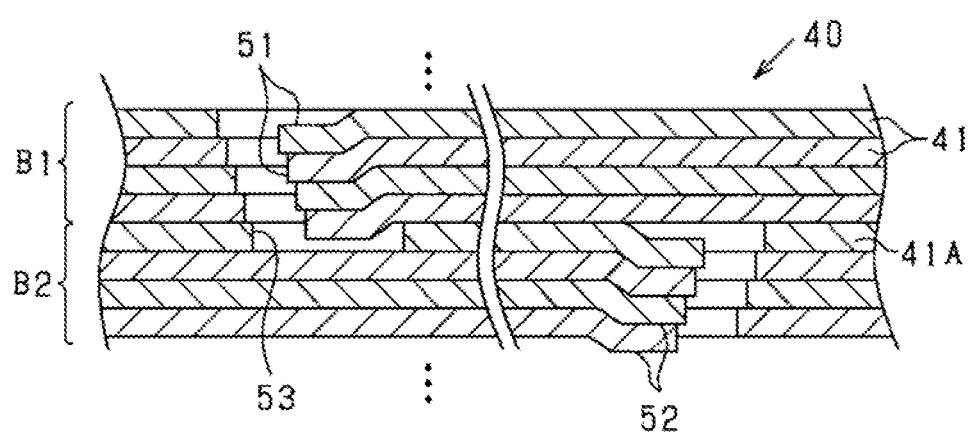

FIG. 6(a) shows an intermediate steel plate 41A, and FIG. 4(b) shows a cross-section at a connected portion of the respective core blocks B1 and B2, that is, a cross-section of a portion including the intermediate steel plate 41A. As described in FIG. 5(c), the intermediate steel plate 41A has crimping portions 52 formed at four positions in the circumferential direction, and hole portions 53 formed at four positions in the circumferential direction. In the second embodiment, in the intermediate steel plate 41A, the crimping portions 52 and the hole portions 53 are alternately arranged on the same circle in the circumferential direction, and the intervals between the adjacent crimping portions 52 and the hole portions 53 are uniform.

The hole portion 53 is, for example, a punched hole formed by punching using a press, and the width and length of the hole portion 53 are set the same as those of the crimping portions 51 and 52. However, the length of the hole portion 53 may be longer than the crimping portions 51 and 52. The hole portion 53 has the same width as the crimping portion 51 of the first core block B1, thereby allowing the crimping portion 51 to be press-fitted. In this sense, it can be said that the hole portion 53 is a crimping hole.

The position of the hole portion 53 with respect to the crimping portion 52 is a position rotated by an angle θ1 in the circumferential direction. In the second embodiment, the crimping portions 52 and the hole portions 53 are arranged at equal intervals, and the angle θ1 in the circumferential direction is 45 degrees (=360/8).

In FIG. 6(b), the crimping portion 51 of the first core block B1 enters the hole portion 53 of the intermediate steel plate 41A, and owing to the hole portion 53, interference of the crimping portion 51 is avoided. Further, by inserting the crimping portion 51 into the hole portion 53, the two steel plates 41 at the block boundary position can be crimped, and both the core blocks B1 and B2 can be suitably integrated at the time of manufacturing the rotor core 40.

Figure 7:
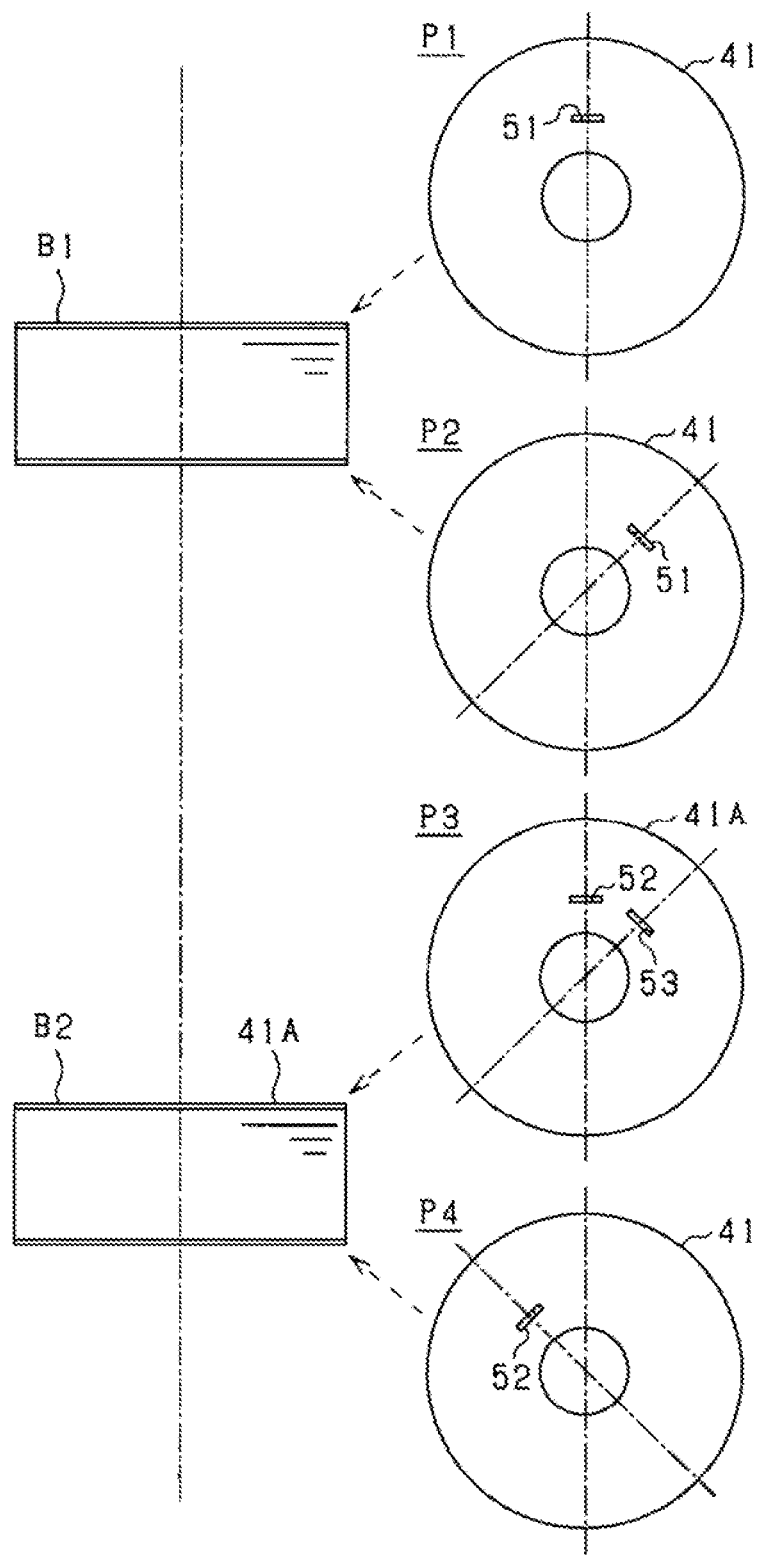
FIG. 7 is a diagram for describing the configuration of steel plates at both axial end portions in each core block.

Here, FIG. 7 is a diagram for explaining the steel plate 41 at both end portions in the axial direction in each of the core blocks B1 and B2. In FIG. 7, among the steel plates 41 of the respective core blocks B1 and B2, the end steel plate at the upper end (the opposite side of the second core block B2) of the first core block B1 is denoted as P1, the end steel plate at the lower end (the second core block B2 side) is denoted as P2, the end steel plate at the upper end (the first core block B1 side) of the second core block B2 is denoted as P3, and the end steel plate at the lower end (the opposite side of the first core block B1) is denoted as P4. For the sake of convenience, the illustration of the slot 44 is omitted in the respective steel plates 41, and either one of the crimping portions 51 or 52 is illustrated. Here, the crimping positions of P2 to P4 and the like will be described on the basis of the position of the crimping portion 51 shown in P1.

In the first core block B1, the respective steel plates 41 are skewed by 45 degrees in the clockwise direction of the drawing from the steel plate 41 at the upper end to the steel plate 41 at the lower end. Then, the first core block B1 and the second core block B2 are connected so that the position of the crimping portion 51 of the steel plate 41 at the lower end of the first core block B1 coincides with the position of the hole portion 53 of the steel plate 41 (the intermediate steel plate 41A) at the upper end of the second core block B2. In the second core block B2, the respective steel plates 41 is skewed by 45 degrees in the counterclockwise direction of the drawing from the steel plate 41 at the upper end to the steel plate 41 at the lower end.

As can be seen from FIG. 7, among both sides of the steel plates 41 in the first core block B1, the steel plate 41 on a side opposite to the intermediate steel plate 41A has a circumferential position of the crimping portion 51 on the same position as the circumferential position of the crimping portion 52. The second core block B2 is connected to the first core block B1 by inserting the crimping portion 51 into the hole portion 53. The position of the insertion is at the second core block B2 at a position rotated at an angle of 45 degrees with respect to the crimping portion 51 in the steel plate 41 at the upper end of the first core block B1 (i.e., 360 degrees/n/2: where n is the number of crimped portions).

Figure 4:
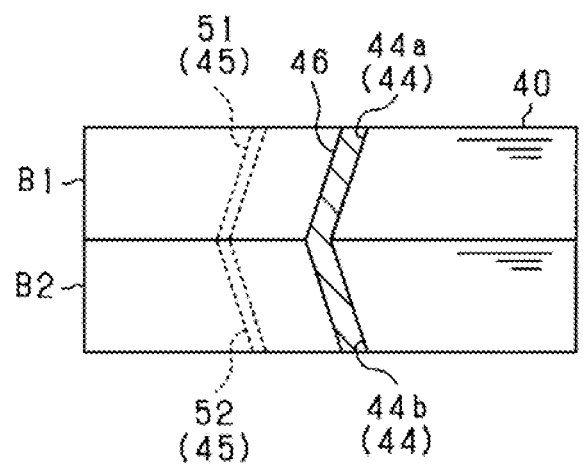
FIG. 4 is a diagram showing the configuration of the rotor core.
Figure 4:
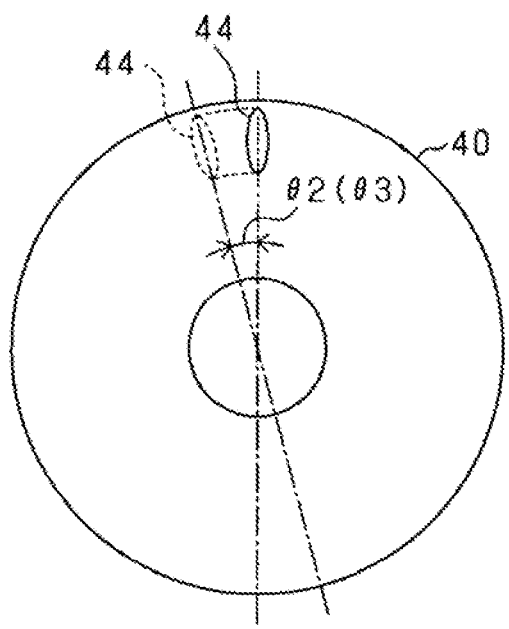

The description returns to FIG. 4. As shown in FIG. 4(a), the first core block B1 is provided with a first rotor slot 44a which passes through the steel plate 41 in the stacking direction and which is skewed at the same angle as the crimping portion 51, and the second core block B2 is provided with a second rotor slot 44b which passes through the steel plate 41 in the stacking direction and which is skewed at the same angle as the crimping portion 52 on the opposite side of the first rotor slot 44a. The respective rotor slots 44a and 44b are connected to each other and include the conductor bars 46 inside.

Here, the respective core blocks B1 and B2 are provided with the k slots 44 (first rotor slot 44a and second rotor slot 44b) at equal intervals in the circumferential direction, and the respective slots 44 are provided between both axial ends of the respective core blocks B1 and B2 such that such rotor slots are skewed in a range (angle θ2) defined (360 degrees/k) in the circumferential direction. In the second embodiment, k=60 and θ2=6 degrees. In FIG. 4(b), the solid line indicates the slot position at the upper end of the first core block B1, and the broken line indicates the slot position at the lower end of the first core block B1.

Alternatively, the slots 44 of the rotor core 40 may be skewed according to the number (m) of the slots 34 of the stator core 21. In this case, the respective slots 44 in the first core block B1 and the second core block B2 may be skewed in the circumferential direction in a range of 360 degrees/m (angle θ3) between both axial ends of the respective core blocks B1 and B2. In the second embodiment, m=72 and θ3=5 degrees.

Hereinafter, components other than those described above, which are provided to the rotary electric machine 10, will be described.

Figure 8:
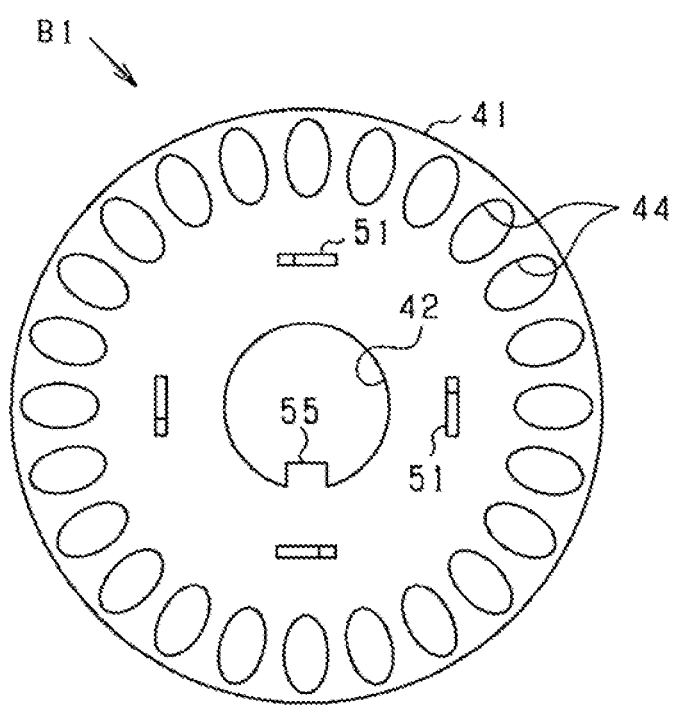
FIG. 8 is a diagram showing keys provided on the rotor core.

As shown in FIG. 8, a key 55 as a key structure part is provided in the shaft hole 42 formed at the center in the radial direction of the rotor core 40. The key 55 is provided on at least one end side of both ends of the core so as to protrude toward the axis center at the inner peripheral portion of the shaft hole 42. The key 55 is keyed to a keyway provided in the rotary shaft 11. As the key structure part, a key groove may be provided instead of the key 55. The key 55 (key structure part) may be provided over the entire shaft hole 42 in the axial direction.

Figure 9:
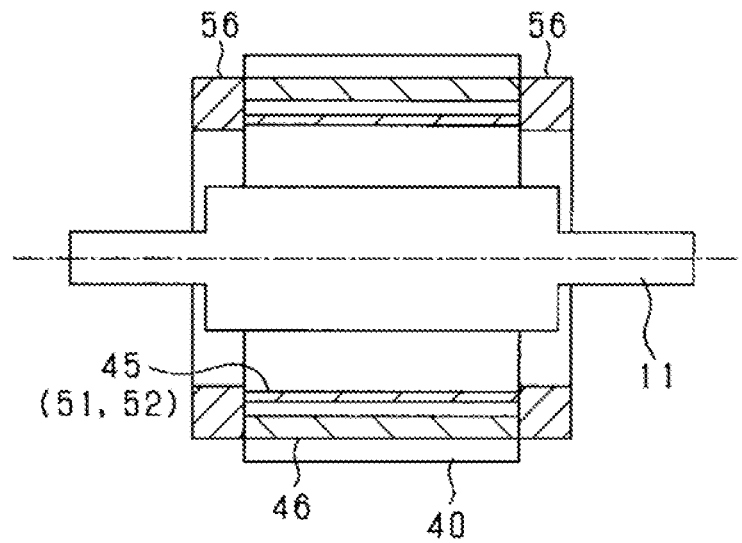
FIG. 9 is a view showing an end ring provided in the rotor core.
Figure 9:
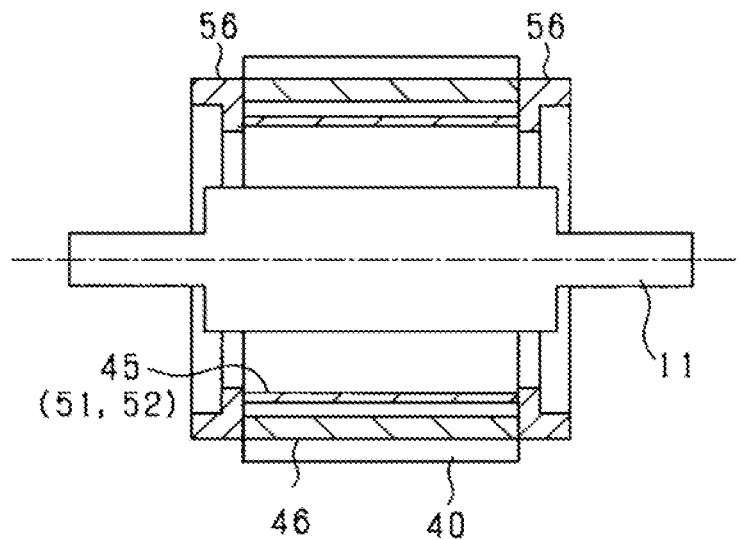

As shown in FIG. 9(a), end rings 56 are provided at both axial ends of the rotor core 40 by casting molten metal such that the end rings 56 cover the crimping portions 51 and 52 of the lamination holding portion 45. Further, in the lamination holding portion 45, the crimping portions 51 and 52 located at both ends of the rotor core 40 are filled with the casting material in the crimping portions 51 and 52 of the stacked steel plates 41. It is also possible to use a conductive non-metallic material as the casting material.

As shown in FIG. 9(b) which is a modification of FIG. 9(a), an end ring 56 may have a lower height of a portion covering crimping portions 51 and 52 with respect to a height of a rotor core 40 from an end surface in a portion covering an end portion of a conductor bar 46.

According to the second embodiment described in detail above, the following excellent effects can be obtained.

In the above-described configuration, since the hole portion 53 for inserting the crimping portion 51 of the first core block B1 is provided in the intermediate steel plate 41A, which is a steel plate at the block boundary position, connected to the first core block B1 from the second core block B2, interference with the crimping portion 51 can be avoided by the hole portion 53. Further, since the crimping portion 51 of the first core block B1 is inserted into the hole portion 53 of the second core block B2, mutual positioning of the core blocks B1 and B2 becomes easy. As a result, the workability in manufacturing the rotor 12 can be improved.

In the rotor core 40 having the above-described configuration, the core blocks B1 and B2 are integrally connected in a press mold for pressing the steel plate 41, and thereafter, molding of a casting portion is performed in the mold. In this step, the work efficiency can be improved. In addition, it is possible to improve the positional accuracy of the core blocks at the time of combining the core blocks B1 and B2. Therefore, it is possible to suppress the inconvenience that the conductor bar 46 is locally thinned at the joint boundary portions between the core blocks B1 and B2.

Incidentally, as in the conventional technique, due to the configuration in which the positioning pins are passed through a plurality of straight holes in the axial direction formed in the respective core blocks, since the plurality of positioning pins are inserted over the entire axial direction, differences in the hole positions of the inserted positioning pins occur when taking in consideration the positional accuracy or the like of the straight holes, thereby leaving a concern that the conductor bar may be locally thinned in accordance with the differences. In this respect, in the rotary electric machine 10 of the second embodiment, it is possible to minimize the inconvenience as in the conventional technique.

The crimping portion 51 is provided on one end side in the axial direction of the first core block B1 (the opposite side of the second core block B2) extending to the other end side in the axial direction (the second core block B2 side) such that the crimping portion 51 is skewed in the rotation angle defined (360 degrees/n/2) (where n is the number of crimps) in the circumferential direction. Among both sides of the steel plates 41 in the first core block B1, the steel plate 41 on a side opposed to the intermediate steel plate 41A has a circumferential position of the crimping portion 51 on the same position as the circumferential position of the crimping portion 52. In this case, the crimping portions 51 and 52 can be uniformly arranged in the entire circumferential direction over the first core block B1 and the second core block B2. In this way, the product thickness deviation in the circumferential direction can be reduced.

The hole portion 53 provided in the intermediate steel plate 41A of the second core block B2 is a crimping hole that allows the crimping portion 51 of the first core block B1 to be press-fitted. Therefore, the two core blocks B1 and B2 can be connected by crimping. As a result, it is possible to improve the workability in handling the first core block B1 and the second core block B2 together.

Since the shaft hole 42 is provided with a key 55 (key structure part) keyed to the rotary shaft 11, the phase of the rotor core with respect to the rotary shaft 11 can be properly determined.

The respective slots 44 (the first rotor slot and the second rotor slot) are provided at opposing skew angles to each other in the core blocks B1 and B2 in the rotor core 40, and with the slots 44 in a connected manner, the conductor bars 46 are provided in the rotor slots. In this case, since the skew angles of the slots 44 are opposed to each other in the respective core blocks B1 and B2, forces can be generated in opposite directions to each other in the respective core blocks B1 and B2 when the conductor bars 46 in the slots 44 are energized, and axial vibration can be suppressed.

The respective core blocks B1 and B2 are provided with crimping portions 51 and 52 arranged radially inward than the slot 44. As a result, the crimping portions 51 and 52 can be suitably provided by using the radially opposed position with respect to the stator 13.

In the respective core blocks B1 and B2 of the rotor core 40, the k slots 44 (rotor slots) are provided at equal intervals in the circumferential direction. The respective slots 44 are provided between both axial ends of the core blocks such that such rotor slots are skewed in a range defined by (360 degrees/k) in the circumferential direction. In this case, the excitation force, which occurs in the radial direction, caused by the slot 44 of the rotor core 40 can be reduced. In addition, magnetic noise can be reduced.

Alternatively, the m-piece slots 34 (stator slots) are provided in the stator core 21 at equal intervals in the circumferential direction, and the slots 44 of the respective core blocks B1 and B2 are provided between both axial ends of the core blocks B1 and B2 such that the slots 44 are skewed in a range defined 360 degrees/k in the circumferential direction. In this case, the excitation force in the radial direction caused by the slot 34 of the stator core 21 can be reduced. In addition, magnetic noise can be reduced.

The rotary electric machine 10, which is a cage-type induction machine, is configured to provide an end ring 56 arranged at both axial ends of the rotor core 40 by casting, and the end ring 56 is arranged to cover the crimping portions 51 and 52 at both ends of the rotor core 40. In this case, since the gap between the crimping portions 51 and 52 are filled with the casting material (molten metal) forming the end ring 56, even if vibration or the like occurs when the rotary electric machine 10 is used, for example, the crimping off the laminated steel plate caused by such vibration or the like can be suppressed.

In the end ring 56, the height of the portion covering the crimping portions 51 and 52 is set lower than the height of the rotor core 40 from the end surface in the portion covering the end portion of the conductor bar 46. In this case, the casting material is allocated to each part in accordance with the required amount of each part of the rotor 12, so that weight reduction and cost reduction of the rotor 12 can be achieved.

With respect to the rotary electric machine 10, by using the above-mentioned excellent rotor 12, it is possible to realize a configuration that is inexpensive and has high reliability against noise and vibration.

In the resolver 25 in which the resolver rotor 26 and the resolver stator 27 are arranged to face each other radially inward and outward, there is a concern that the rotation detection may be affected by a positional deviation in the axial direction caused by vibration or the like. In this respect, as described above, since the axial vibration can be minimized by combining the core blocks B1 and B2 having different skew directions to each other in the rotor core 40, the influence on the rotation detection can be minimized, and thus the deterioration of the detection accuracy can be minimized.

In the rotary electric machine 10 in which the pulley 18 is fixed to the rotary shaft 11 by a nut 19 (fastening member), variation in the clamping force (axial force) of the nut 19 due to axial vibration can be minimized. As a result, loosening of the nut 19 can be minimized.

Other Embodiments

The above-mentioned second embodiment may be modified, for example, as follows.

The rotor core 40 may have a configuration in which three or more core blocks are connected in the axial direction, for example, the first core block B1 is connected to both axial sides of the second core block B2. As the configuration, for example, the configurations of FIGS. 10A and 10B are assumed. For the sake of convenience, FIG. 10 shows one from each of the lamination holding portions 45 (crimping portions 51 and 52) and a conductor bar 46.

Figure 10:
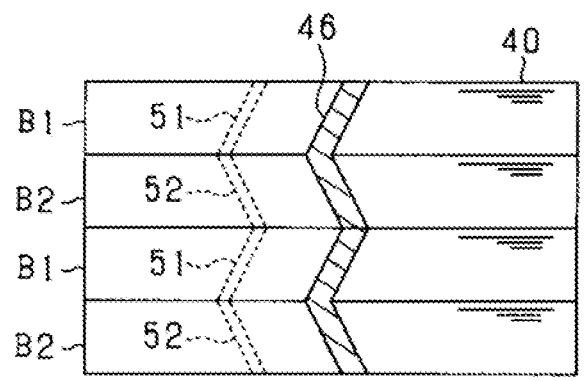
FIG. 10 is a diagram showing a rotor core in which three or more core blocks are combined.
Figure 10:
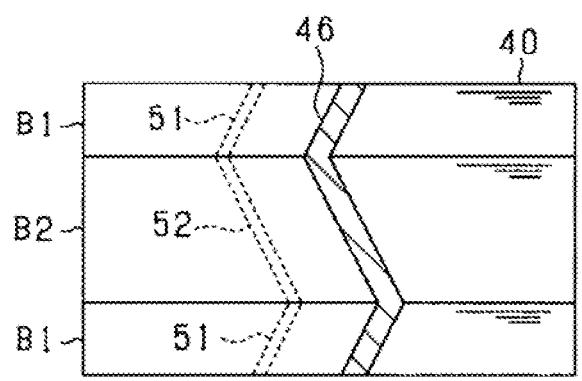

In FIG. 10(*a*), starting from the top to the bottom, the first core block B1, the second core block B2, the first core block B1, and the second core block B2 are arranged in this order, and these four core blocks are combined to each other. In each of the core blocks B1 and B2, the number of stacked steel plates 41 is the same. In FIG. 10(*b*), starting from the top to the bottom, the first core block B1, the second core block B2, and the first core block B1 are arranged in this order, and these three core blocks are combined to each other. In this case, in the second core block B2, the number of laminated steel plates 41 is twice the number (giving twice the thickness) of laminated steel plates of the first core block B1.

Figure 11:
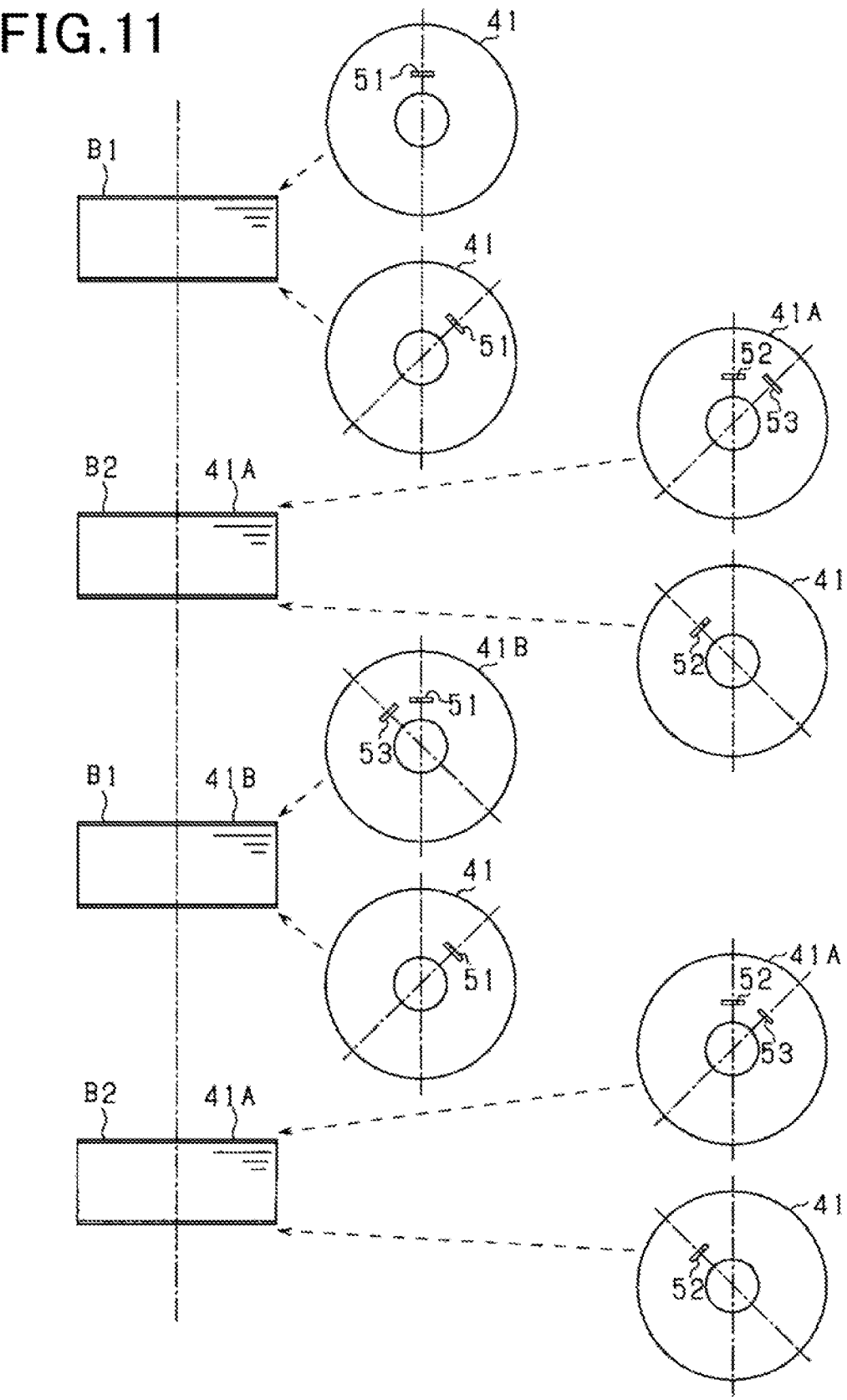
FIG. 11 is a diagram for describing the configuration of steel plates at both axial end portions in each core block.

FIG. 11 is a diagram for describing the steel plate 41 of the respective core blocks B1 and B2 in the rotor core 40 of FIG. 10(*a*). Here, similarly to FIG. 7 described above, the illustration of the slot 44 in the respective steel plates 41 is omitted, and only one of either the crimping portions 51 or 52 is illustrated. In FIG. 11, the skew in the respective core blocks B1 and B2 is as described with reference to FIG. 7 and the like. In addition, since the core block is provided in four stages, in the respective core blocks in the second, third, and fourth stages from the top, a hole portion 53 for inserting the crimping portion of the upper steel plate 41 is provided in the intermediate steel plates 41A and 41B at the block boundary position, respectively. Here, in addition to the fact that the hole portion 53 for inserting the crimping portion 51 of the first core block B1 is formed in the intermediate steel plate 41A of the second core block B2, the hole portion 53 for inserting the crimping portion 52 of the second core block B2 is formed in the intermediate steel plate 41B of the first core block B1.

Figure 12:
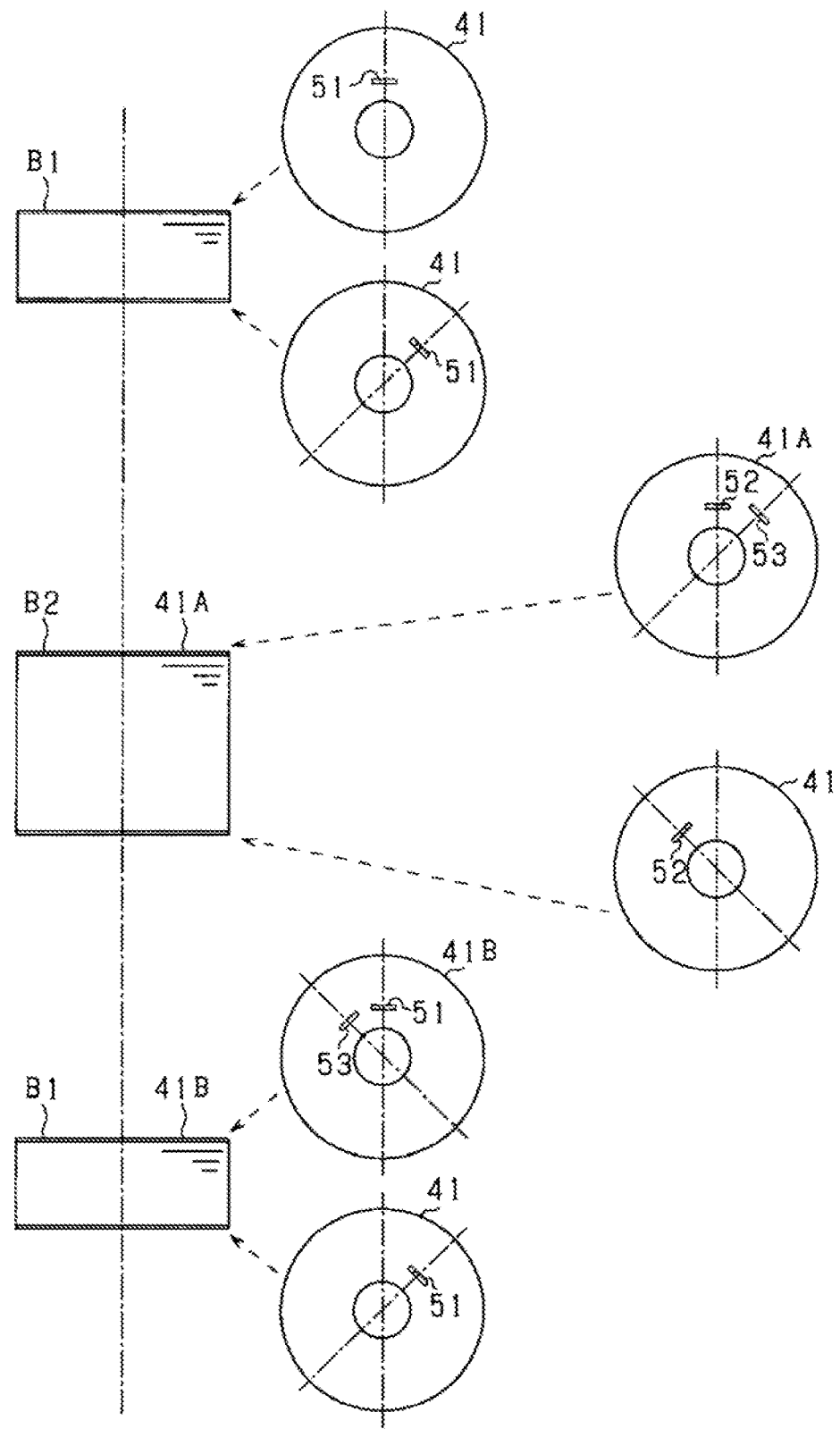
FIG. 12 is a diagram for describing the configuration of steel plates at both axial end portions in each core block.

FIG. 12 is a diagram for describing the steel plate 41 of the respective core blocks B1 and B2 in the rotor core 40 of FIG. 10(*b*). The basic configuration is as described above, and since the core blocks are provided in three stages, the hole portion 53 are provided in the intermediate steel plates 41A and 41B at the block boundary positions in the respective core blocks in the second and third stages from the top.

According to the above-described configuration, even in the rotor core 40 in which three or more core blocks B1 and B2 are connected in the axial direction, it is possible to improve the workability when manufacturing the rotor 12.

Figure 13:
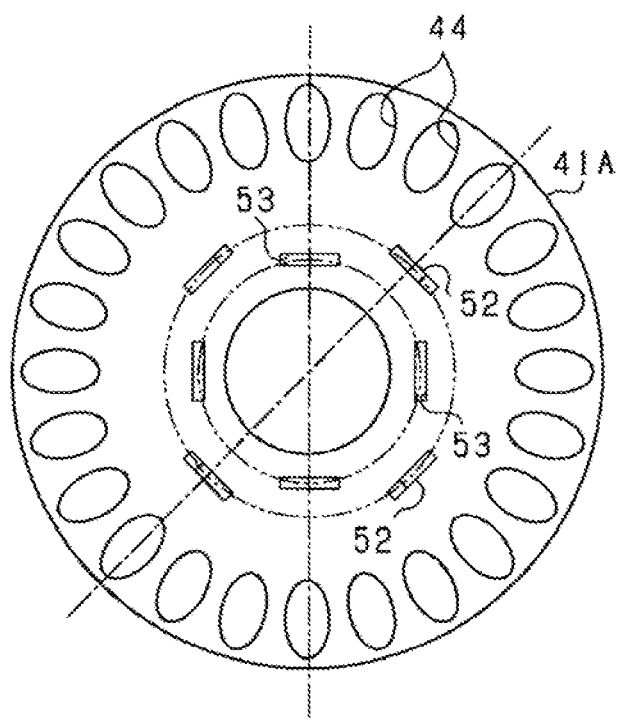
FIG. 13 is a plan view of an intermediate steel plate.

In the above-described second embodiment, the crimping portion (crimped portion) 51 of the first core block B1 and the crimping portion (crimped portion) 52 of the second core block B2 are provided on circles having the same radius, but these may be changed to provide the respective crimping portions 51 and 52 on circles having different radii to each other. In this case, for example, when the crimping portion 51 of the first core block B1 is provided on the inner radial side and the crimping portion 52 of the second core block B2 is provided on the outer radial side, as shown in FIG. 13, in the intermediate steel plate 41A, the crimping portion 52 of the second core block B2 is formed on the outer radial side and the hole portion 53 is formed on the inner radial side.

In the above-described second embodiment, the projecting direction of the crimping portion in the respective core blocks B1 and B2 are set to the same axial direction, but the axial direction can be changed. For example, the crimping portion may protrude toward the second core block B2 from the first core block B1, and the crimping portion may protrude toward the first core block B1 from the second core block B2. In this case, at the boundary portion between the respective core blocks B1 and B2, "hole portions" may be provided in the end steel plates (intermediate steel plates) of the respective core blocks B1 and B2.

The crimping portions 51 and 52 provided on the steel plate 41 do not need to have a straight shape, and may have a circular arc shape having a radius corresponding to the distance from the core axis. In this case, the hole portion 53 of the intermediate steel plate 41A is also formed in a circular arc shape. The hole portion 53 may be simply inserted instead of press-fitting the crimping portion.

Figure 14:
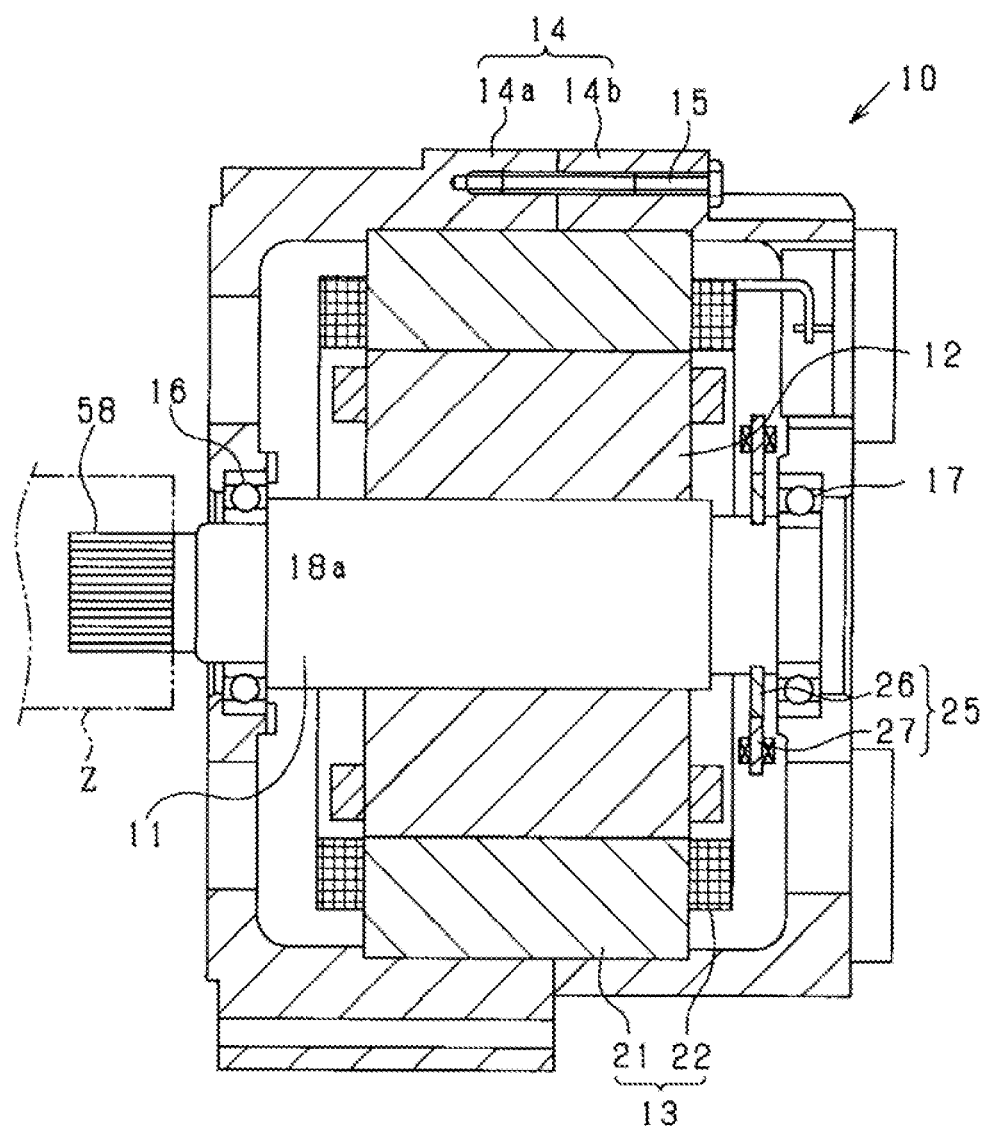
FIG. 14 is an axial cross-sectional view of a rotary electric machine in another example.

In the above-described second embodiment, the pulley 18 is fixed to the distal end portion of the rotary shaft 11 in the rotary electric machine 10 (see FIG. 1); however, this configuration may be changed. For example, the rotary electric machine 10 shown in FIG. 14 describes a configuration of a rotating member Z (e.g., a rotary shaft of a transmission) which rotates coaxially with a distal end portion of the rotary shaft 11. On the distal end portion of the rotary shaft 11, a spline 58 is connected so that the spline 58 can transmit power to the rotating member Z.

In the rotary electric machine 10 described above, since the axial vibration can be minimized by combining the core blocks B1 and B2 having different skew directions in the rotor core 40, it is possible to minimize the wear of the splines 58 and the generation of foreign matter due to the axial vibration.

The rotary electric machine 10 can be put into practical use as an electric generator, an electric motor, or both of them mounted on a vehicle. It is also possible to use the rotary electric machine 10 having the above-described configuration for applications other than mounting it on a vehicle.

The present disclosure has been described in accordance with the examples so far. However, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

What is claimed is:

1. A rotor of a rotary electric machine having a rotor core that includes a plurality of annular steel plates with abutting side faces, the plurality of annular steel plates including a first set of steel plates and a second set of steel plates, the rotor comprising:

a first core block that includes the steel plates of the first set of steel plates, each of the steel plates of the first set of steel plates includes n first crimping portions, the first set of steel plates are held in abutment by the n first crimping portions and skewed in a first direction in a circumferential direction; and a second core block that includes the steel plates of the second set of steel plates, each of the steel plates of the second set of steel plates includes n second crimping portions, the second set of steel plates are held in abutment by the n second crimping portions and skewed in a second direction opposed to the first direction, wherein:

$n \geq 2$;

the second set of steel plates includes an intermediate steel plate located at an end of the second set of steel plates adjacent to the first set of steel plates;

the first set of steel plates includes first and second end steel plates at opposing first and second end sides of the first core block, the first end side of the first core block being opposite to the intermediate steel plate, the second end side of the first core block being adjacent to the intermediate steel plate;

the intermediate steel plate includes plurality of first holes;

the first crimping portions of the second end plate at the second end side are received in the plurality of first holes;

the intermediate steel plate being connected to the first core block;

the n first crimping portions are at equal intervals in the circumferential direction;

the n second crimping portions are at equal intervals in the circumferential direction;

the first crimping portions of the first end steel plate at the first end side are at first circumferential positions;

the second crimping portions of the intermediate steel plate are at the first circumferential positions;

the first crimping portions of the second end plate at the second end side are shifted by an angle of (360 degrees/ (n×2)) with respect to the first crimping portions of the first end steel plate at the first end side;

each of the first crimping portions of the second end plate is inserted in one of the first holes of the intermediate steel plate so that the second core block is connected to the first core block in an axial direction of the rotor core;

the first holes of the intermediate steel plate and the second crimping portions of the intermediate steel plate alternate in the circumferential direction; and an angular interval between each of the first holes and an adjacent one of the second crimping portions in the circumferential direction is the angle of (360 degrees/ (n×2)).

2. The rotor of the rotary electric machine according to claim 1, wherein:

the first core block comprises two first core blocks;

the rotor core is configured to connect the two first core blocks and the second core block in the axial direction;

the second core block has opposing first and second axial sides;

the intermediate steel plate is at the first axial side of the second core block, so that one of the two first core blocks at the first axial side of the second core block is connected to the intermediate steel plate;

the steel plates of a second of the two first core blocks include a second intermediate steel plate at the second axial side of the second core block;

the second intermediate steel plate includes a plurality of second holes;

the steel plates of the second core block include a third end steel plate at the second axial side of the second core block;

the third end steel plate has the second crimping portions; and the second crimping portions of the third end steel plate are received in the plurality of second holes so that the second of the two first core blocks is connected to the second core block.

3. The rotor of the rotary electric machine according to claim 2, wherein:

the rotor core has a shaft hole in a radial center into which a rotary shaft is inserted and at least one end of the shaft hole in the axial direction has a key structure part keyed to the rotary shaft.

4. The rotor of the rotary electric machine according to claim 3, wherein the first core block includes a first rotor slot in the steel plates of the first set of steel plates, the first rotor slot passing through the first set of steel plates in a stacked direction of the first set of steel plates and being skewed at an angle which is the same as a skewed angle of each first crimping portion;

the second core block includes a second rotor slot in the steel plates of the second set of steel plates, the second rotor slot passing through the second set of steel plates in a stacked direction of the second set of steel plates and being skewed at an angle which is the same as a skewed angle of each second crimping portion and being skewed in an opposing side to the first rotor slot; and the first rotor slot and the second rotor slot are connected by conductor bars received in the first and second rotor slots.

5. The rotor of the rotary electric machine according to claim 4, wherein:

first and second crimping portions are radially inward from the rotor slots.

6. The rotor of the rotary electric machine according to claim 4, wherein:

the first core block includes first rotor slots at equal intervals in a circumferential direction;

the second core block has k second rotor slots at equal intervals in the circumferential direction;

$k \geq 2$; and the rotor slots are skewed in a range defined by (360 degrees/k) in the circumferential direction between both axial ends of the first and second core blocks.

7. The rotor for the rotary electric machine according to claim 4, wherein:

the rotor slots in the first core block and the second core block are between axial ends of the first and second core blocks such that the rotor slots are skewed in a range defined by (360 degrees/m) in the circumferential direction; and $m \geq 2$.

8. The rotor of a rotary electric machine according to claim 4, wherein:

the rotor has casted end rings at both axial ends of the rotor core;

the first crimping portions and the second crimping portions include end crimping portions at the both ends of the rotor core;

the end crimping portions being covered by the casted end rings; and the first and second crimping portions are filled with a casting material from the end crimping portions.

9. The rotor of the rotary electric machine according to claim 1, wherein:

each of the first holes of the intermediate plate of the second core block is a crimping hole to which a corresponding one of the first crimping portions is press-fitted.

10. The rotor of a rotary electric machine according to claim 1, wherein:

the rotor core has a shaft hole into which a rotary shaft is inserted in a radial center, and at least one end of the shaft hole in the axial direction has a key structure part keyed to the rotary shaft.

11. The rotor of the rotary electric machine according to claim 1, wherein:

the first core block includes a first rotor slot in the steel plates of the first set of steel plates, the first rotor slot passing through the first set of steel plates in a stacked direction of the first set of steel plates and being skewed at an angle which is the same as a skewed angle of each first crimping portion;

the second core block includes a second rotor slot in the steel plates of the second set of steel plates, the second rotor slot passing through the second set of steel plates in a stacked direction of the second set of steel plates and being skewed at an angle which is the same as a skewed angle of each second crimping portion and being skewed in an opposing side to the first rotor slot; and the first rotor slot and the second rotor slot are connected by conductor bars received in the first and second rotor slots.

12. The rotor of the rotary electric machine according to claim 11, wherein the first and second crimping portions are radially inward from the rotor slots.

13. The rotor of the rotary electric machine according to claim 11, wherein:

the first core block includes first rotor slots at equal intervals in a circumferential direction;

the second core block has k second rotor slots at equal intervals in the circumferential direction;

k≥2; and the rotor slots are skewed in a range defined by (360 degrees/k) in the circumferential direction between both axial ends of the core blocks.

14. The rotor for the rotary electric machine according to claim 11, wherein:

the rotor slots in the first core block and the second core block are between axial ends of the first and second core blocks such that the rotor slots are skewed in a range defined by (360 degrees/m) in the circumferential direction;

and m≥2.

15. The rotor of the rotary electric machine according to claim 11, wherein:

the rotor has casted end rings at both axial ends of the rotor core;

the first crimping portions and the second crimping portions include end crimping portions at the both axial ends of the rotor core;

the end crimping portions being covered by the casted end rings; and the first and second crimping portions are filled with a casting material from the end crimping portions.

16. The rotor of the rotary electric machine according to claim 15, wherein:

the end rings have a lower height at a portion covering the first and second crimping portions than a height of the rotor core.

17. A rotary electric machine comprising:

a rotor including a plurality of annular steel plates with abutting side faces; and a stator opposed to the rotor, wherein the rotor comprises:

a first core block that includes the steel plates of the first set of steel plates, each of the steel plates of the first set of steel plates includes n first crimping portions, the first set of steel plates are held in abutment by the n first crimping portions and skewed in a first direction in a circumferential direction; and a second core block that includes the steel plates of the second set of steel plates, each of the steel plates of the second set of steel plates includes n second crimping portions, the second set of steel plates are held in abutment by the n second crimping portions and skewed in a second direction opposed to the first direction, wherein:

n≥2;

the second set of steel plates includes an intermediate steel plate located at an end of the second set of steel plates adjacent to the first set of steel plates;

the first set of steel plates includes first and second end steel plates at opposing first and second end sides of the first core block, the first end side of the first core block being opposite to the intermediate steel plate, the second end side of the first core block being adjacent to the intermediate steel plate;

the intermediate steel plate includes a plurality of first holes;

the first crimping portions of the second end plate at the second end side are received in the plurality of first holes;

the intermediate steel plate being connected to the first core block;

the n first crimping portions are at equal intervals in the circumferential direction;

the n second crimping portions are at equal intervals in the circumferential direction;

the first crimping portions of the first end steel plate at the first end side are at first circumferential positions;

the second crimping portions of the intermediate steel plate are at the first circumferential positions;

the first crimping portions of the second end plate at the second end side are shifted by an angle of (360 degrees/(n×2)) with respect to the first crimping portions of the first end steel plate at the first end side;

each of the first crimping portions of the second end plate is inserted in one of the first holes of the intermediate steel plate so that the second core block is connected to the first core block in an axial direction of the rotor core;

the first holes of the intermediate steel plate and the second crimping portions of the intermediate steel plate alternate in the circumferential direction; and an angular interval between each of the first holes and an adjacent one of the second crimping portions in the circumferential direction is the angle of (360 degrees/(n×2)).

18. The the rotary electric machine according to claim 17, wherein:
the first core block includes a first rotor slot in the steel plates of the first set of steel plates, the first rotor slot passing through the first set of steel plates in a stacked direction of the first set of steel plates and being skewed at an angle which is the same as a skewed angle of each first crimping portion;
the second core block includes a second rotor slot in the steel plates of the second set of steel plates, the second rotor slot passing through the second set of steel plates in a stacked direction of the second set of steel plates and being skewed at an angle which is the same as a skewed angle of each second crimping portion and being skewed in an opposing side to the first rotor slot; and
the first rotor slot and the second rotor slot are connected by conductor bars received in the first and second rotor slots.

19. The rotary electric machine according to claim 18, comprising:
a rotary shaft fixed to a radial center of the rotor and a rotation detector configured to detect rotation of the rotary shaft; wherein:
the rotation
detector comprises a detector rotor rotating with the rotary shaft and a detector stator radially outside the detector rotor and facing the detector rotor; and
the detector rotor is attached to the rotary shaft or the rotor.

20. The rotary electric machine according to claim 19, further comprising: a pulley fixed to a distal end portion of the rotary shaft; and
a fastening member configured to fix the pulley by an axial crimping force in the axial direction is attached to the distal end portion of the rotary shaft.

21. The rotary electric machine according to claim 20, comprising:
a rotating member connected to the distal end portion of the rotary shaft and rotating with the rotating member; and
a spline on the distal end portion of the rotary shaft that is connected in a power-transmittable state to the rotating member.

* * * * *